Aug. 27, 1929.　　J. C. GOOSMANN　　1,725,910
PRESSURE ACTUATED VALVE
Filed Jan. 18, 1926　　2 Sheets-Sheet 1
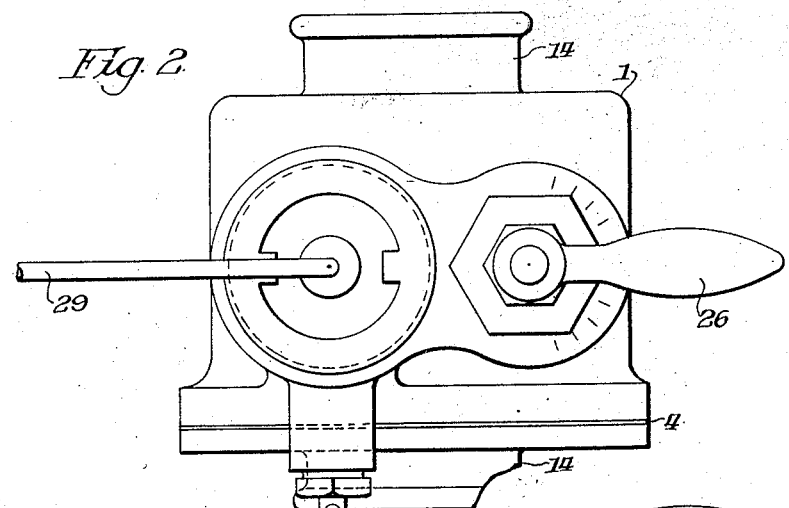
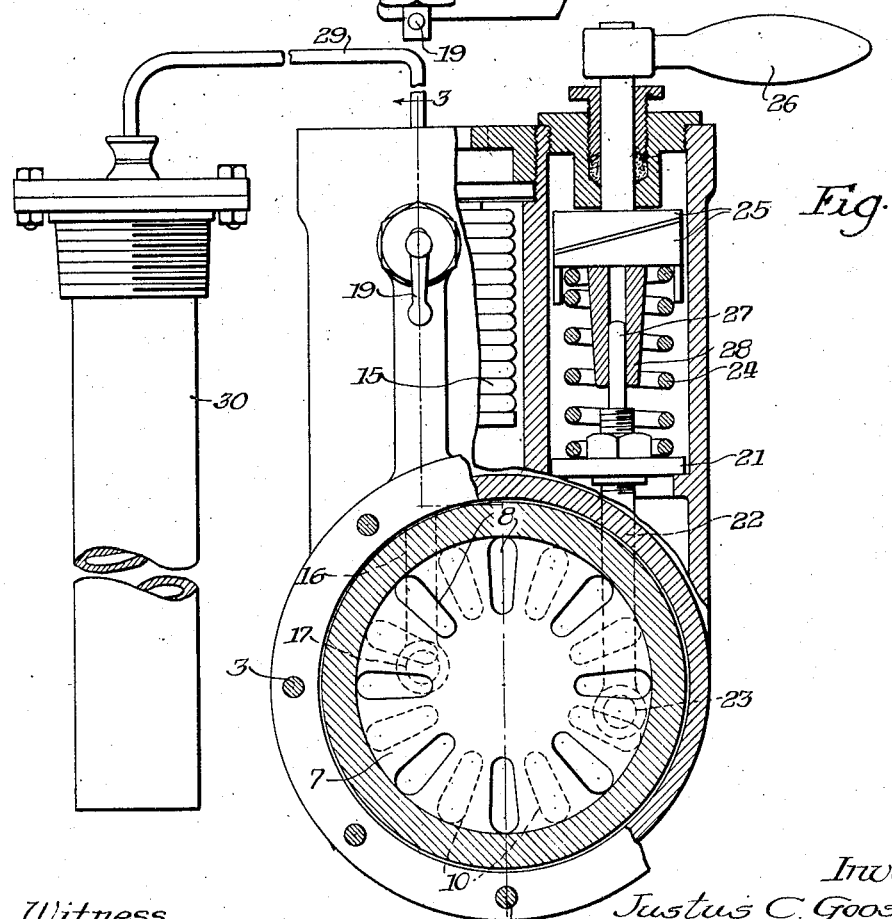
Witness
Inventor:
Justus C. Goosmann
By Ira J. Wilson
Atty.

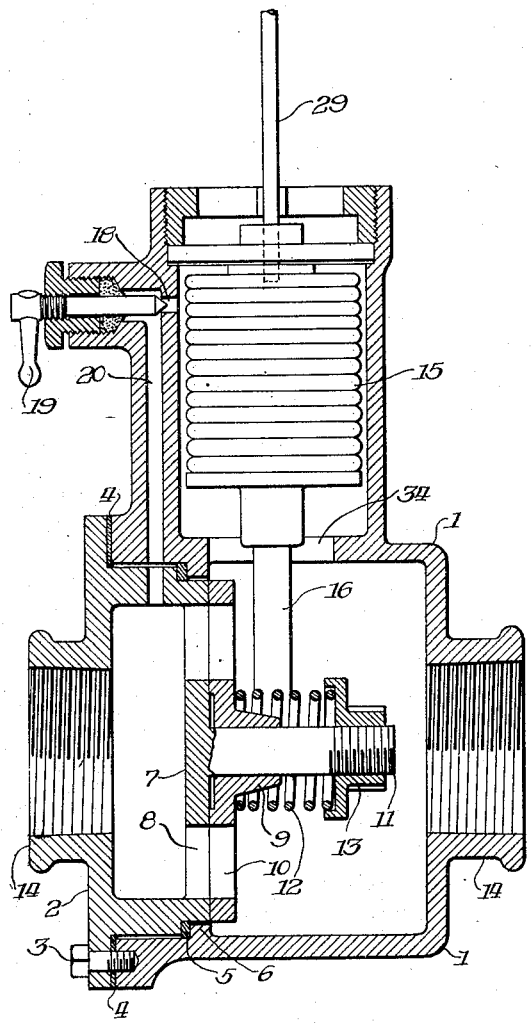
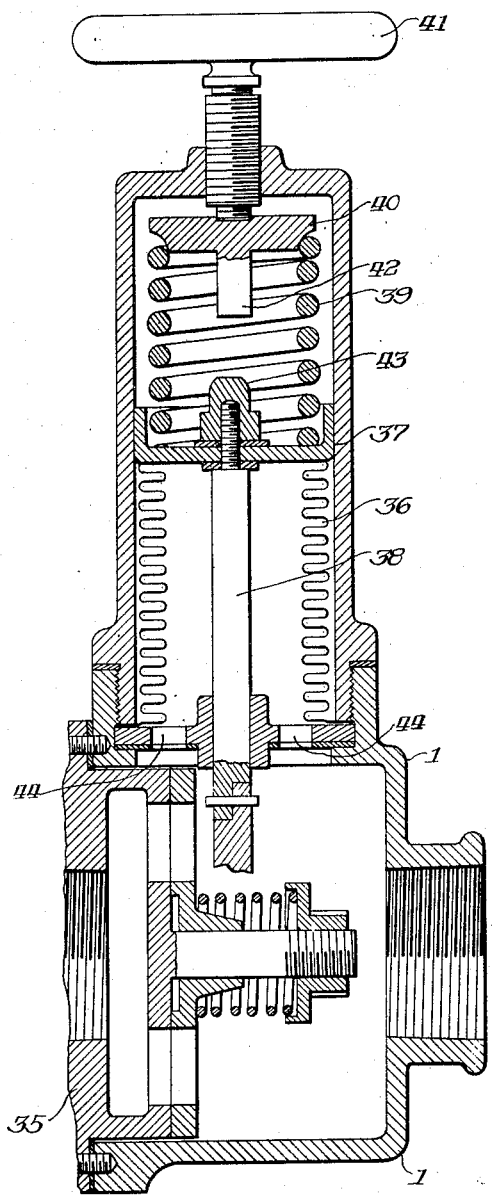

Patented Aug. 27, 1929.

1,725,910

UNITED STATES PATENT OFFICE.

JUSTUS C. GOOSMANN, OF CHICAGO, ILLINOIS.

PRESSURE-ACTUATED VALVE.

Application filed January 18, 1926. Serial No. 82,080.

This invention relates to valves which may be automatically operated by variations of pressure or temperature occurring in the fluids, whether gaseous or liquid, which they control.

While my invention may be used wherever the above conditions and requirements exist, it is particularly adapted for use in the field of artificial refrigeration. A brief study of the specification and the drawings attached will reveal that a temperature or pressure increase or decrease in the fluid within the valve will cause contraction or compression, or expansion of an expansible element, and since one portion of the element is, in a preferable form held relatively stationary to another, the latter portion must move and cause the valve to operate. On the other hand it may be desirable to control the flow of a fluid, not alone by its own temperature or pressure conditions but in multiple, in parallel or in series, with some independent source of control, or in some instances only through physical or chemical changes effective at some remote station independent of or dependent upon some characteristic of the fluid, its temperature, velocity, pressure etc.

In one form of the invention an expansible element, such as a metal bellows, may be filled with a material having a high coefficient of expansion or conduction. A fluid medium having the desired qualities is preferred but as the material to be utilized to operate the expansible element should be determined by the conditions encountered in the use of the invention, its type or character and qualities will be left to those skilled in the art for determination. Any material whether solid, liquid or gaseous, susceptible of expansion and contraction or ready conduction or both may be utilized, dependent upon the conditions of use of the invention.

The operating mechanism in the illustrated embodiments of my invention is arranged to effect a very considerable opening of the valve upon a comparatively slight movement of the said element. However, by methods explained hereinafter, the movements of the elements and the valve may be varied for different needs.

One of the objects of this invention is to produce a valve having an expansible element therein, which may be contracted or expanded by pressure and/or temperature variations in the fluid controlled by the valve, thereby causing the valve to open or to close, as desired.

Another purpose of this invention is to provide a valve having an expansible element functioning as above set forth, and also operable by reason of the effect of remote temperatures and/or pressures regardless of the source of such temperatures and pressures.

Another object is to provide a valve control mechanism which may, if desired, be controlled only through the effects of remote temperatures or pressures at one or more stations.

Another object is to provide adjustable means for opposing certain of the movements of the valve, while still another includes the provision of a valve control arrangement adapted for either automatic or manual control and susceptible of ready modification for manual regulation of the effects of temperature or pressure at a remote station or within the valve itself.

Another object is to provide means for holding the valve at all times tightly against its seat.

A further purpose is to provide a valve in which the fluid under its control will exert a pressure on the valve and urge it against its seat.

A still further object of this invention is to provide a valve which will automatically maintain perfect seating despite the wear incident to use.

Many other objects and means for attaining them will become apparent upon reference to the description and claims and to the drawings in which:

Fig. 1 is an end view partly in section of one embodiment of my invention.

Fig. 2 is a plan view of the valve shown in Fig. 1.

Fig. 3 is a vertical section on a jog line through the center of the expansible element and through the center of the valve chamber of the valve in Fig. 1.

Fig. 4 is a vertical section on a jog through the center of the expansible element and through the center of the valve chamber of another embodiment of my invention.

Referring particularly to Figs. 1 and 3, the housing, generally indicated as 1, may be, as here illustrated, a unitary structure serving as a casing for the valve and as a housing for the valve operating mechanism.

The removable valve seat generally indicated as 2, is attached to the casing by machine screws 3, and a suitable packing ring 4 is provided as a seal against escape of fluid. Another packing ring 5 abuts the shoulder 6 serving as another seal. The valve seat proper, indicated as 7, is provided with ports 8, which in this embodiment, are spaced at equal intervals about the surface of the seat and equally distant from the center of the seat, but it will be clearly apparent that only one port need be provided. A plurality of ports in the valve seat and valve may under some conditions be preferable because giving a more even distribution of the fluids passed, but for other purposes single cooperative ports may be entirely satisfactory. The rotatable valve 9 is provided with ports 10 which are spaced and cut to correspond with the ports 8 of the valve seat so that in one position ports 8 and 10 will register, and upon rotation of the valve they will be staggered so that they will not register. The valve 9 is mounted rotatably upon a post 11 which is here shown integral with the valve seat. In order to hold this valve firmly against the seat a compression spring 12 is arranged about the post, presses against the valve and is compressed by the nut 13, which may be adjusted to regulate the compression of the spring and serves as a fixed abutment for the spring which enables the latter to maintain a tight seal between the faces of the valve and the valve seat, and, in addition compensates for whatever wear may take place on those surfaces.

It will be noted that when the valve is closed the pressure of the fluid within the valve will be exerted against the valve in such a way as to aid in urging it tightly against the seat.

While this is the preferred method of securing the valve within the casing and urging it against its seat, it is manifest that I might employ other means for rotatably securing this valve within the casing and for holding it against its seat. The method of applying the pressure of a spring against this valve may also be varied without departing from the scope of my invention.

Suitable means for attaching this valve to adjacent pipes are provided and here illustrated, being generally indicated as 14. In Figs. 1 and 3, a type of expansible element, a metal bellows 15 is provided and mounted with its upper end in fixed position relative to the housing. Attached to the bottom of this expansible element is a connecting rod 16 which is pivotally attached to the valve at the point 17. Whenever the element, which is made of a suitable flexible metal, is contracted or expanded, it is apparent that the consequent motion of the connecting rod will cause the valve to rotate, bringing the ports 8 and 10 into or out of registration as desired. The expansible element in this form of the invention may be filled with a fluid having a high coefficient of expansion or a high coefficient of conduction or one having both characteristics may be substituted, if desired.

Since in some uses it is desirable that the thermostatic or pressure actuated element 15 respond solely to the temperature of the fluid entering the valve, I preferably arrange the chamber in which the element is placed in such manner that fluid entering the valve will always be in direct contact with the walls of the element, although the temperature variations of the fluid in the valve would normally be transmitted to the element by conduction through the connecting rod 16 were the element isolated from the valve chamber. When the fluid from the valve chamber contacts with the walls of the element, whether the latter be filled with an expansible medium or not, conduction takes place, causing the element to expand or contract. The element is also directly influenced by pressure variations or changes in the fluid entering the valve as will be appreciated.

In order that the fluid in the valve chamber may be caused to circulate around the bellows and impart to that element its temperature or pressure characteristics, a port 34 is provided in the housing or chamber in which the element 15 is situated and provision is made in the valve illustrated in Figs. 1 and 3 for maintaining circulation of a small amount of the fluid entering the valve through the housing or chamber containing the expansible element and through an adjustable by-pass into the portion of the casing beyond the valve. This by-pass is provided with a port 18 leading from the housing and protruding through a suitable stuffing box is an adjustable needle 19 which is arranged to seat upon the face of the port 18 and which may be adjusted toward or from said seat. A conduit 20 is provided to carry this by-pass fluid into the outer portion of the valve. By opening the by-pass valve, a small amount of fluid may be caused to circulate around the expansible element and thereby cause more rapid conduction of heat from the fluid which the valve controls to the element 15 or vice versa.

Fig. 1 also shows a device for opposing the expansible action of the element 15. A piston 21 connected to a connecting rod 22 which is in turn pivotally attached to the valve at the point 23, carries on its top surface a compression spring 24 which is held in compression by cams 25. The upper cam may be rotated by means of a handle 26 to give any of several desired pressures upon this piston 21 while the lower cam may be secured against rotation in any desired manner as by guides and guide-ways. The motion of the piston is centrally guided by the plunger 27 sliding within the sleeve 28. It is evident that this compression spring and the associated piston rod will oppose the expansion of the element 15 with a force which may be regulated at will by means of the handle 26.

It will be noted that when the handle 26 is sufficiently rotated, the sleeve 28 may be forced down far enough to positively push against the top of the piston and produce a direct and positive operation of the valve.

A further means of altering the temperature or pressure conditions within the element 15 is provided. A tube 29, to which a thermal or pressure responsive device, indicated generally at 30, is connected, opens at its opposite end into the element 15. The device 30 may be of any other suitable type than that herein illustrated which is adapted to contain a medium responsive to temperature or pressure variations at one or more remote stations for influencing or affecting the action of the element 15. This device 30, therefore, may be used to increase or decrease the pressure within or the temperature of the element 15 without regard to the temperature or pressure conditions that exist within the valve casing.

In Fig. 4 a pressure actuated valve, being a slightly different embodiment of my invention, is illustrated. The valve seat, generally indicated as 35, is differently designed due to the elimination of the by-pass, however, the ports in the seat and in the valve are preferably the same as those shown in Fig. 3. The expansible element here shown and indicated at 36 is attached to the housing at its bottom, and at its top is attached to the movable piston 37. A connecting rod 38 connects this piston to some suitable point on the rotary valve close to the center of the latter. It is obvious then, that a movement of this piston will cause the valve to rotate and this movement is subject to the pressure of a compression spring 39 which bears against the piston and against a compressing plate 40. An adjustable hand screw 41 mounted on the top of the housing is used as a means for adjusting the amount of compression exerted upon the piston by the spring 39. It will be noted that by turning the hand screw 41 down far enough, the pin 42 attached to the plate 40 may be caused to push against the cap nut 43 and positively rotate the valve.

The modification shown in Fig. 4 is provided with ports 44 to admit of a free circulation between the valve chamber and the interior of the expansible element 36, but no connection for remote control has been illustrated. It will be obvious, however, that this construction could be modified, if desired, to include the feature of remote control in a manner analogous to but not the same as that illustrated in Figs. 1, 2 and 3, and described above.

Solely for the purpose of illustration, as will be understood, the two modifications or forms of the invention each embodying a rotary disc valve have one or more ports, yet it is manifest that the principles of the invention may be embodied in valves of other types such as in a valve of the ordinary disc or gate type. These two types of valves, gate and disc, are well known and the application of the invention to them is well within the skill of one versed in the art to which this specification is addressed. It would also be possible and in some cases very useful or even necessary to arrange the valve and valve seat ports of those forms of the invention illustrated in what I shall term a differential arrangement, i. e. the ports so formed and relatively arranged to one another in both the valve and the valve seat and as between the valve and valve seat as to provide increased or decreased flow upon opening or closing movement of the valve stem or connecting rods 16 and 38 in either arithmetical or geometrical ratio. The principles of the invention may indeed be applied to valves of the multiple connection or multiple chamber type, i. e., to valves having a plurality of fluid receiving chambers and required connections to said chambers, regardless of the type of outlet or inlet control such valves may embody as will be understood.

I have shown and described two of the preferred embodiments of my invention and have indicated in a general manner that the application of the invention is of far broader scope than might be at first assumed from viewing the drawings. It is accordingly manifest that the constructions and arrangements to which my invention may be applied are perhaps unlimited and susceptible of many variations without departure from the essence of the invention or the scope of the appended claims.

I claim:

1. In a valve the combination of a casing, an inlet chamber in said casing, a seat provided with a plurality of ports, a rotatable valve provided with ports adapted to register with said ports in said seat, an expansible element in said casing exposed to the pressure variations of the fluid in said chamber when the valve is closed and an operative connection from said element to a point on said valve between its periphery and axis whereby a slight expansion and contraction of said element will rotate said valve a large amount to bring said ports into and out of registration.

2. A fluid regulating device comprising a casing having a fluid inlet chamber, a rotatable valve in said casing, an expansible element in said casing having a surface exposed to the fluid in said chamber when the valve is closed and movably responsive to pressure variations of the fluid in the chamber when the valve is closed, a valve seat having a port, said valve when closed being normally urged tightly against the seat by the pressure of the fluid against the valve, and means for connecting said element to said valve whereby fluid pressure variations in said chamber will move said element and rotate said valve to regulate said port.

3. A fluid regulating device comprising a casing having a fluid inlet chamber, a valve in said casing, a hollow expansible element in said casing having its exterior surface exposed to the fluid in said chamber and movably responsive to pressure variations of said fluid when the valve is closed, means for subjecting the interior of said element to pressure variations in a fluid independent of the fluid in the inlet chamber, a valve seat having a port, means for connecting said element to said valve whereby fluid pressure variations in said chamber and within said element will move said element and valve to regulate said port, and means for positively actuating the valve independently of said element.

4. A fluid regulating device comprising a casing having a fluid inlet chamber, a valve in said casing, an expansible element in said casing having a surface exposed to the fluid in said chamber and movably responsive to pressure variations of said fluid on the inlet side of the valve when the valve is closed, a valve seat having a port, means for connecting said element to said valve whereby fluid pressure variations in said chamber will move said element and rotate said valve to regulate said port, and a regulator for variably opposing the movement of said valve, said regulator being adapted also for positively actuating the valve.

5. A fluid regulating device comprising a casing having a fluid inlet chamber, a valve in said chamber, a valve seat having a port, the valve being subject to the fluid pressure in said chamber to hold it firmly on the seat when the valve is closed, hollow pressure actuated means in said casing operated by the said fluid pressure in the chamber for moving the valve to open the port and means for subjecting the interior of said means to a fluid pressure independent of the fluid pressure in said chamber.

6. A fluid regulating device comprising a casing having a fluid inlet chamber, a rotary valve in said chamber, a valve seat having a port, a hollow expansible element in said casing having a surface exposed to the fluid in said chamber and movably responsive to the pressure variations of said fluid when the valve is closed, said element being adapted to expand and contract under an actuation of fluid pressure exerted on its interior and longitudinally movable means connecting said element to said valve at a point near the axis of said valve whereby slight longitudinal movement of said means will cause a large amount of rotative movement of the valve relative to the port.

7. A fluid regulating device comprising a casing having a fluid inlet chamber, a valve in said casing, an expansible element in said casing having a surface exposed to the fluid in said chamber and movably responsive to pressure variations of said fluid when the valve is closed, a valve seat having a port, means for subjecting another surface of said element to pressure variations in a fluid independently separated from the fluid in the inlet chamber, said valve being urged tightly against its seat by the fluid pressure thereon when closed and means for connecting said element to said valve whereby fluid pressure variations in said chamber and fluid pressure variations in said independent fluid will move said element and rotate said valve to regulate said port.

8. A fluid regulating device comprising a casing having a fluid inlet chamber, a rotatable valve in said casing, a seat having a plurality of ports, an inclosed expansible compartment containing a fluid and having an external surface in said casing exposed to the fluid in said chamber, said compartment being expansible by pressure variations acting from without upon its external surface and pressure variations acting from within upon its internal surface, means extending from the interior of said compartment to the exterior of the casing by means of which the internal pressure of said compartment may be varied, and means for connecting said compartment to a point on said valve between its axis and the perimeter of the ports whereby a small movement of said compartment in response to internal and external pressure variations will cause a proportionately large rotational movement of said valve to regulate said port.

In witness of the foregoing I affix my signature.

JUSTUS C. GOOSMANN.